United States Patent [19]

Vars et al.

[11] Patent Number: 5,398,724
[45] Date of Patent: Mar. 21, 1995

[54] HIGH SPEED ELECTRICALLY ACTUATED GASEOUS FUEL ADMISSION VALVE

[75] Inventors: Curtis C. Vars; Dale A. Beckman, both of Fort Collins, Colo.

[73] Assignee: Woodward Governor Company, Rockford, Ill.

[21] Appl. No.: 83,613

[22] Filed: Jun. 28, 1993

[51] Int. Cl.⁶ .................... F16K 31/06; F02M 51/06
[52] U.S. Cl. .................... 137/625.33; 251/129.01; 251/129.16; 251/333; 123/490
[58] Field of Search .............. 251/129.01, 129.16, 251/333, 625.33; 123/490

[56] References Cited

U.S. PATENT DOCUMENTS

| | | | |
|---|---|---|---|
| 2,325,878 | 8/1943 | Ray | 251/129.15 |
| 3,777,977 | 12/1973 | Regneault et al. | |
| 3,802,626 | 4/1974 | Regneault et al. | |
| 4,925,156 | 5/1990 | Stoll et al. | 251/129.01 |
| 4,932,632 | 6/1990 | Nicol | 251/129.15 X |
| 4,941,447 | 7/1990 | Mannhardt | 251/129.16 X |
| 5,082,180 | 1/1992 | Kubo et al. | |

*Primary Examiner*—Arnold Rosenthal
*Attorney, Agent, or Firm*—Leydig, Voit & Mayer, Ltd.

[57] ABSTRACT

An electronic fuel admission system for use in an industrial engine or the like, having high speed electrically operated flow control valve assemblies for controlling fuel flow to the engine's cylinders via an air intake system is disclosed. The valve assembly comprises two opposed face-to-face disks; one disk being fixed, the other being translatable with respect to the fixed disk. Both disks include ports distributed around their surfaces such that flow is prevented when the disks abut yet a slight separation results in a relatively high flow rate. The translatable disk is connected to an armature which is associated with a high permeability magnetic core having a coil for generating magnetic flux within the core. The system includes a two phase driver for energizing the coil which first provides a high current of short duration to rapidly generate flux in the core and rapidly attract the armature thereby separating the translatable disk from the fixed disk and opening the valve. The two phase driver then provides the coil with a lower current to lower the flux in the core to a level that will enable rapid closing of the valve, but which remains sufficient to hold the disks apart in the open position. Finally, the disk is rapidly closed by collapsing the flux field in the core such that the translatable disk compresses against the fixed disk.

21 Claims, 5 Drawing Sheets

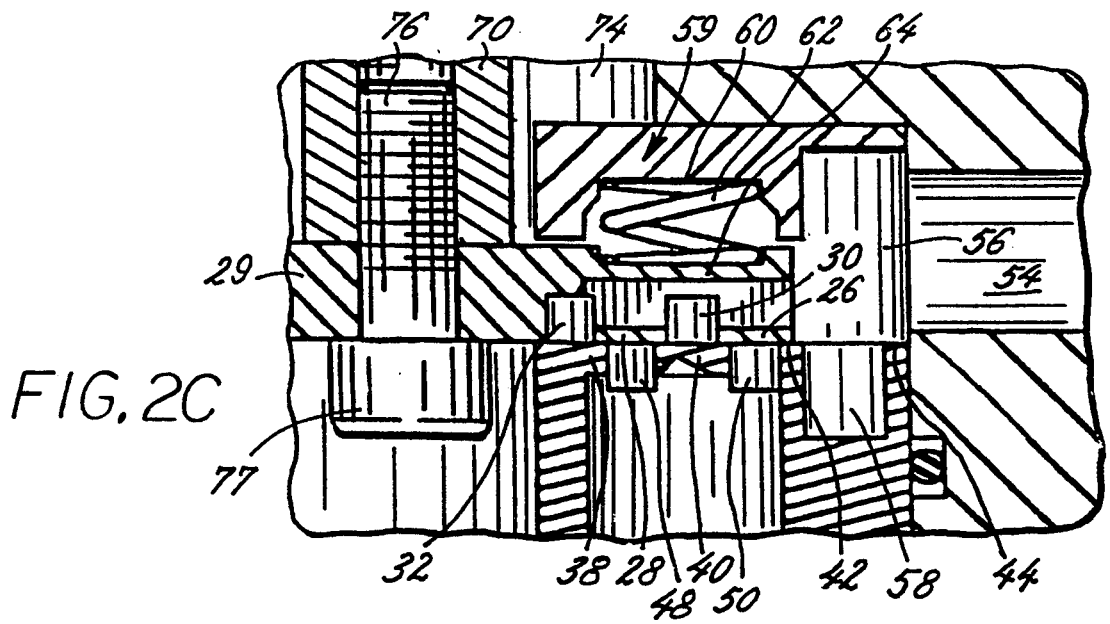
FIG. 2C
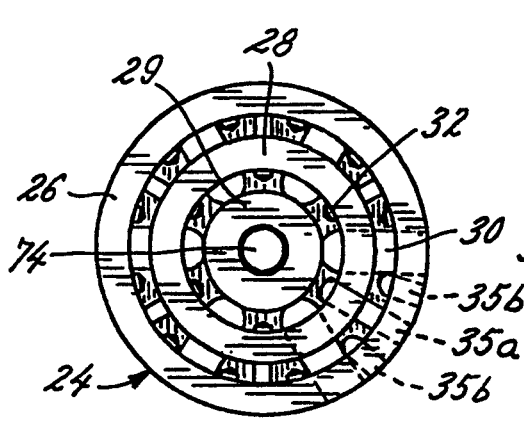
FIG. 3A
FIG. 3B
FIG. 3C

HIGH SPEED ELECTRICALLY ACTUATED GASEOUS FUEL ADMISSION VALVE

FIELD OF THE INVENTION

This invention relates generally to electrically operated valves, and more particularly to a high speed precision valve suited for use as a gaseous fuel admission valve in a fuel admission system.

BACKGROUND OF THE INVENTION

Fuel admission applications for large stationary internal combustion industrial engines have been handled in the past by mechanically actuated valves capable of developing rather large valve actuating forces which were thought necessary for the pressures and flow rates encountered in such applications. Although, it would be desirable to provide an electrically actuated fuel admission valve for such applications, the perceived need for high actuating forces combined with fast, reliable actuation have weighed against this development. Moreover, although electrically actuated fuel admission valves have been used in small engine applications, the technology is not readily transferable to the much larger industrial engines. Indeed, providing an electrically actuated gaseous fuel admission valve for very large engines cannot be accomplished by simply scaling up an electrically operated fuel admission valve for a smaller application, such as an automotive engine, because the pressures, flow rates, and power for the large, industrial engines—often on the order of thousands of horsepower—present an application which is substantially different in kind than the automotive.

In general, the large industrial engines of the past have been either single fuel (such as diesel or natural gas, for example) or multiple fuel (capable of running on either of those fuel sources). The ability to precisely control the admission of fuel to each cylinder of a multiple cylinder engine for such applications is very important because balanced firing of all of the cylinders will reduce both engine vibrations and engine wear. In addition, balanced firing will result in improved fuel economy and reduced emissions—important considerations in a society of limited natural resources and heightened sensitivity to environmental issues. Similarly, it can be seen that the valve open time (dwell time), the precise point of opening with respect to rotation of the cam shaft, and the precise point of closing, are also very important in monitoring and controlling the output of the engine. Thus, it is desirable to provide a valve which is easily monitored and individually adjustable within an engine to achieve efficient operation.

Both the steady state and operating characteristics of the valve itself are important in determining its flow characteristics. The steady state characteristic, namely the size of the port or ports within the valve, is the major component in determining fuel flow. However, in a fuel admission application, it is desirable to pass the same amount of fuel through the individual valve assemblies every cycle to achieve the balanced firing and consistent operation mentioned above. Thus, even though the individual valves admit less fuel into the engine during the opening and closing stages of their cycles than during the fully open stage, it is important that the amount of fuel admitted during these transition periods is the same from cycle to cycle. Consequently, the operating characteristics of the valve assemblies must be substantially constant such that the opening and closing of the valve is consistent from cycle to cycle.

In the past, large industrial engines have used mechanically or hydraulically actuated valves in order to achieve the necessary flow rates at the pressures involved. For example, it is not unusual to provide cam driven valves which are mechanically opened and closed by a cam shaft driven by the engine itself. Timing with respect to the engine and adequate force for opening and closing the valve in a repeatable fashion is thus readily achieved. However, they are achieved at a rather significant expense in the mechanics of the system. In short, this technique requires a great deal of additional hardware with attendant repair and replacement costs. Furthermore, it is difficult to adjust the dwell time on an individual valve basis, or to provide the control necessary for switching the engine from one type of fuel to another.

In other approaches, hydraulically actuated fuel valves have been utilized to give greater flexibility in admission while still providing the necessary force for operation. Thus, an electrical signal may operate an electrical pilot valve which controls a hydraulic circuit, and the hydraulic circuit then opens and closes the hydraulically actuated fuel control valve. While an approach of this type can give greater flexibility in adjusting the dwell time, for example, it is cumbersome in that it requires a high pressure source of hydraulic fluid in order to achieve fast response. The high pressure source requires a pump (often driven by an associated electric motor), a filtration system, a cooling system, a sump, a regulation system, pipes, return lines and a litany of other components. Thus, this approach requires an excessive amount of additional hardware which translates into additional expenses both in the initial investment and in repair and maintenance of the system.

OBJECTS OF THE INVENTION

In view of the foregoing, it is a general object of the present invention to provide a gaseous fuel admission system for large, industrial engines which utilizes an electromagnetic valve and driver specially configured to provide the control and flow rates needed for such applications. It is a related object to provide a gaseous fuel admission system capable of controlling the operation of each individual valve in a multiple cylinder engine.

It is another object of the present invention to provide an electrically actuated valve for use in fuel admission systems which is both fast acting and highly reliable and at the same time has sufficient capacity for functioning in industrial engines. It is a related object to provide a valve which opens and closes rapidly with minimal delays. It is still another related object of the invention to provide a valve which opens and closes in a predetermined repeatable fashion such that the flow rate is the same during each admission cycle.

It is still another object to provide a valve which is compact, lightweight and economical. It is another object of the invention to provide a valve which can be easily retrofitted to existing engines. It is yet another object to provide a valve which is neither hydraulically nor mechanically actuated. It is still another object to provide a valve which operates under fairly low gas supply pressures and which consumes little power in operation.

SUMMARY OF THE INVENTION

The present invention accomplishes these objectives and overcomes the drawbacks of the prior art by providing a high speed electrically energized flow control valve assembly including a valve body with an inlet port and an outlet port for controlling flow from a higher pressure region connected to the inlet port to a lower pressure region connected to the outlet port. The valve body includes a pair of opposed disks, one of the disks being fixed in the body and the other disk being translatable between a closed position in which the translatable disk closes the ports of the fixed disk and an open position in which the translatable disk is moved a predetermined distance away from the fixed disk to open the ports. The opposed disks include a nested porting arrangement wherein the nested ports are closed when the valve is closed and have multiple peripheries exposed for flow when the valve is opened. The translatable disk includes mating lands which communicate with the ports of the fixed disk. Further, the translatable disk includes lands exposed to the higher pressure region on one side and to the lower pressure region on the other thereby creating a force which urges the translatable disk into the closed position, creating a pressure seal. The valve body is further provided with a low mass, magnetically attractable armature and a core. The armature is attached to the translatable disk. The armature and the core are positioned such that they define an air gap therebetween which is sufficiently small to produce a magnetic field adequate to overcome the pressure seal thereby attracting the armature and attached disk but sufficiently large to allow separation of the opposed disks by the predetermined distance mentioned above.

In one optional embodiment, the invention can be practiced in conjunction with a two phase driver which is capable of controlling the operation of the flow control valve assembly described above. This driver is electrically connected to the coil and has a pull-in phase and a hold-in phase. In the pull-in phase, the driver delivers a high current for controllably powering the coil and rapidly separating the disks. In the hold-in phase, on the other hand, the driver delivers reduced power at a level adequate to hold the disks apart but low enough to promote rapid release and collapse of energy in the coil when the flow control valve assembly is to be closed.

In another optional embodiment, the invention is practiced as part of an electronic fuel admission system for controlling fuel flow to the cylinders of a multiple cylinder internal combustion engine. The electronic fuel admission system includes multiple electromagnetically actuated valve assemblies constructed as described above for controlling gaseous fuel admission into an engine, electronic fuel injection drivers for controllably powering the operation of the individual valve assemblies, and an electronic fuel injection controller for providing the electronic fuel injection drivers with commands dictating when gas admission is to occur. The fuel admission system can manipulate and/or correct the operation of the engine by controlling the activities of the individual valve assemblies as well as controlling all of the valve assemblies together. For example, the operation of an individual valve assembly might be adjusted to achieve balanced firing and the advantages associated therewith, whereas the open time duration of all the valve assemblies would normally be varied simultaneously to govern the speed of the engine.

These and other features and advantages of the invention will be more readily apparent upon reading the following description of the preferred embodiment of the invention and upon reference to the accompanying drawings wherein:

BRIEF DESCRIPTION OF THE DRAWINGS

FIG. 2C is an enlarged fragmentary view similar to FIG. 2B but illustrating the valve assembly in the fully closed shutoff state;

FIG. 3A is a bottom view of the translatable disk employed in the valve assembly taken along lines 3—3 of FIG. 2;

FIG. 3B is a top view of the translatable disk;

FIG. 3C is a side view of the translatable disk;

DESCRIPTION OF A PREFERRED EMBODIMENT

Figure 1:
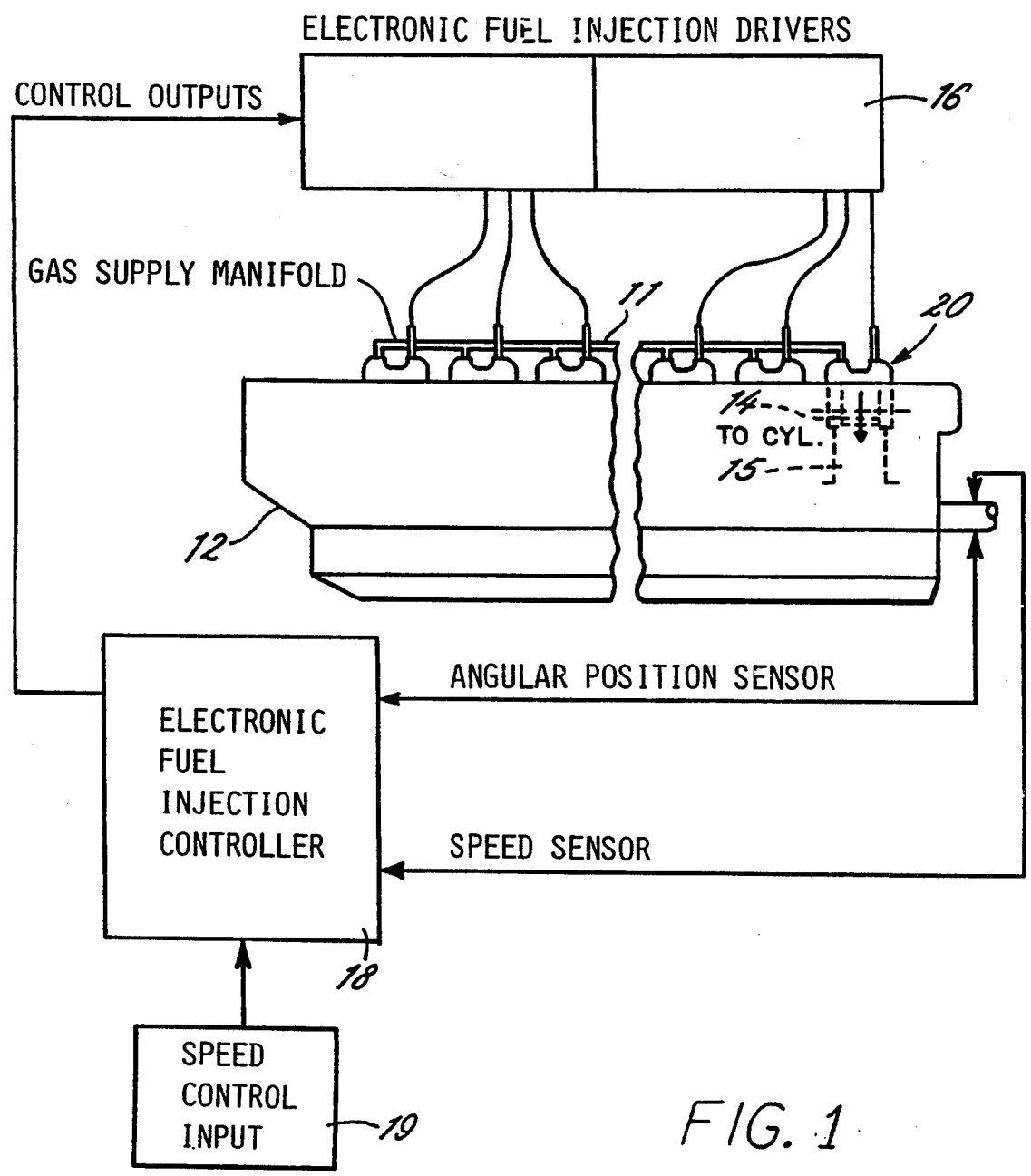
FIGURE. 1 is a block diagram representation of an electronic fuel admission system constructed in accordance with the teachings of the invention.

Turning now to the drawings, FIG. 1 shows a block diagram representation of an electronic gaseous fuel admission system 10 constructed in accordance with the teachings of the invention. FIG. 1 illustrates the fuel admission system 10 in conjunction with a large internal combustion engine 12 which is representative of the type used in industrial applications. It will be appreciated, however, that the internal combustion engine 12 is shown only as an example of an environment in which the invention may be utilized. In its broader aspects, the invention is not limited to use in any specific type of engine or setting. Rather, the invention may be utilized in any apparatus which would benefit as a result of its performance characteristics. For example, the invention might improve the efficiency and performance of reciprocating air and gas compressors as well as the performance of the industrial engines employed in trains, ships and power plants. In view of these widespread uses, nothing in this application is meant to restrict the number or type of applications in which the invention may be used.

Typically, industrial engines 12 such as the one illustrated in FIG. 1 are multiple cylinder, large bore engines capable of generating extremely high power. These engines can be powered by gaseous fuel supplied by a gas supply manifold 11 under a pressure $P_1$ as illustrated in FIG. 1. To reach the combustion cylinders (not shown), the gaseous fuel must pass from the gas supply manifold 11 through a fuel admission valve 14 into an admitted fuel area 15 where it mixes with a flowing stream of air for admission to the cylinder. The admitted fuel area 15 is maintained at a pressure $P_2$ such that opening the fuel admission valve 14 will cause fuel to flow from the higher pressure area, the gas supply manifold 11, to the lower pressure admitted fuel area 15. In one possible application, the admitted fuel area 15 is an air inlet manifold runner associated with a cam-driven air intake valve which leads to the combustion cylinder. In this application the operation of the air intake system maintains the pressure difference across the gas admission valve 14 which causes fuel flow when the valve is open. For explanatory purposes, the admitted fuel area will be described as such an air intake manifold runner maintained at a pressure $P_2$ below the supply pressure $P_1$. However, it will be appreciated that the invention could be employed with other engine configurations and applications.

Figure 2A:
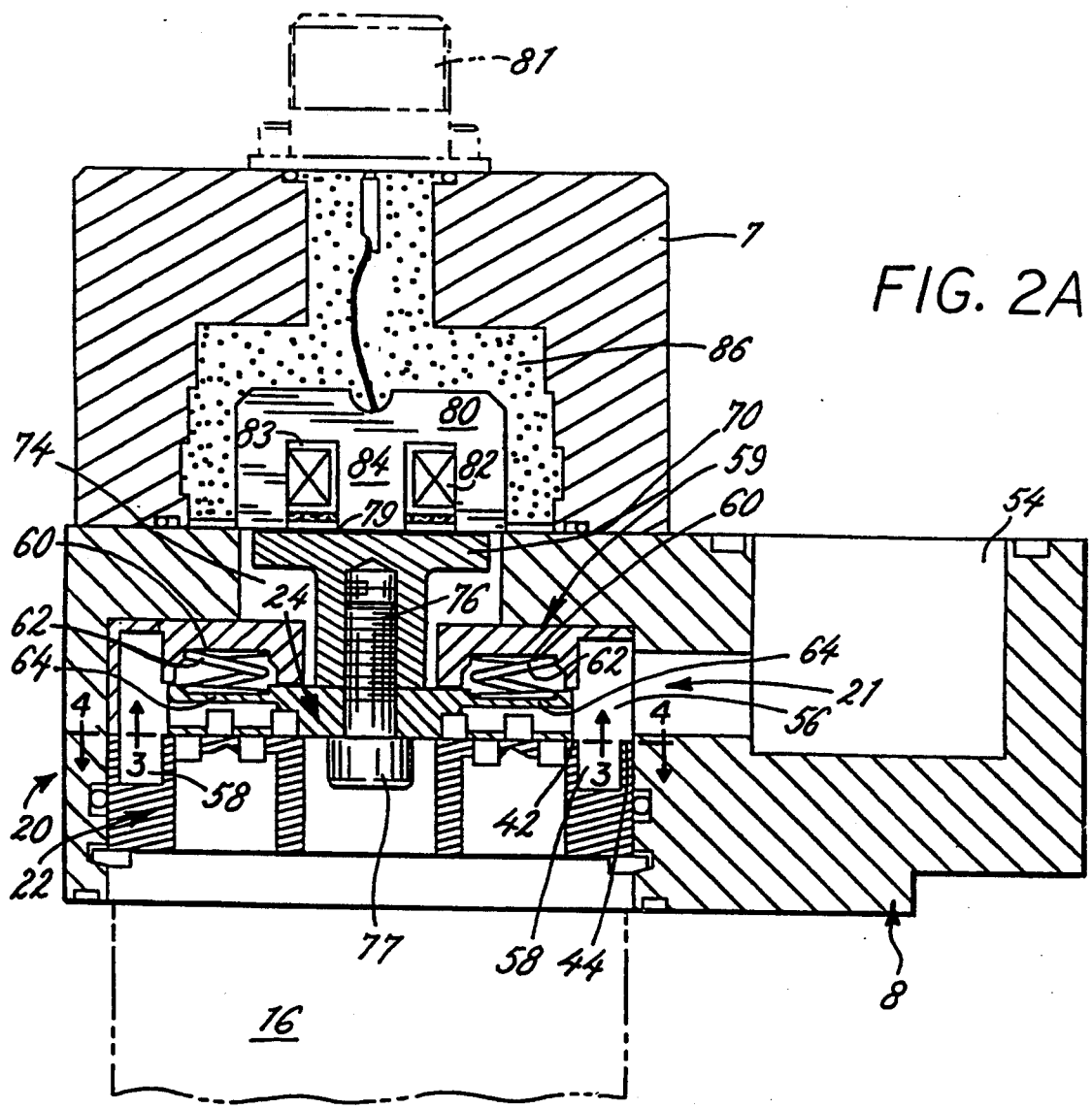
FIG. 2A is a cross-sectional view of a valve assembly constructed in accordance with the teachings of the invention.

In accordance with the invention, the gaseous fuel admission valve 14 separating the gaseous fuel in the supply manifold 11 from the manifold runner 14 is an electromagnetically actuated face-type valve assembly 20 as illustrated in FIG. 2A. The valve body 21 preferably comprises two opposed disks—a translatable disk 24 and a fixed disk 22—each having a nested porting structure as set forth below. The disks 22, 24 are constructed such that when they are juxtaposed no fuel can flow therebetween, yet high fuel flow is attained with only a small separation between the disks 22, 24. Further, since the valve assembly 20 is adapted to computerized control by virtue of its electromagnetic actuation, it is capable of quickly and reliably opening and closing in a repeatable fashion. By controlling the operation of the individual valve assemblies 20, one can control the admission of fuel to the associated cylinders and, thus, the overall operation of the engine 12.

To this end, the electronic fuel admission system 10 is provided with electronic fuel injection drivers 16. These drivers 16 electronically open and close the valve assemblies 20 in the manner set out in detail below. For the present it is sufficient to say that the electronic fuel injection drivers 16 provide sufficient current to rapidly energize the coils and generate magnetic flux in the valve assemblies 20 in a controlled fashion thereby attracting a low mass armature and thus causing the valve assemblies 20 to open and allow fuel to enter the cylinders via the air intake system. When the drivers 16 terminate the current supply, the coils rapidly de-energize via selectively activated turn-off circuits in the driver circuitry and the valve assemblies 20 quickly close preventing further fuel flow. Because this opening and closing cycle is electronically controlled, the valve assemblies 20 function in substantially the same manner from cycle to cycle.

The fuel admission system 10 is further provided with an electronic fuel injection controller 18. This electronic fuel injection controller (EFIC) 18 receives signals from various transducers (not shown) which monitor the output of the engine 12 such as the angular position and speed of the shaft and sends corresponding control signals instructing the drivers 16 when to open and close the valve assemblies 20. Thus, the EFIC 18 governs the overall operation of the fuel admission system 10 by sending signals to the drivers 16 dictating the sequence in which the valve assemblies 20 will open as well as the duration of this open state—the "dwell time". This enables the EFIC 18 to both control the speed of the engine 12 by controlling fuel admission and to tune the engine 12 by correcting the operation of the individual valve assemblies 20 in order to insure balanced firing and attain the advantages associated therewith.

In addition, the fuel admission system 10 is optionally provided with a speed control input 19 which can be user controlled or controlled by another computer. This speed control input 19 can be used to control the speed of the engine during operation to tailor its performance to the user's needs.

It should be noted that although the EFIC 18 is capable of both controlling the speed of the engine 12, and individually adjusting the performance of the valve assemblies 20, the electronic fuel admission system 10 could also be provided with an additional, more powerful, microprocessor based controller (not shown) to perform additional monitoring and control functions. If the system 10 is sufficiently complex to require a second controller, this additional controller can perform the speed control logic functions performed by the EFIC 18 in the illustrated embodiment in addition to its other functions and send commands to the EFIC 18 dictating whether additional fuel or valve assembly dwell time corrections are needed. The EFIC 18 would then communicate the necessary commands to the drivers 16 along with the sequencing information dictating the order of valve assembly operation.

With this general understanding of the overall operation of the fuel admission system 10, it can be appreciated that the construction of the individual valve assemblies 20 forms an important part of the invention. The valve assemblies 20 are disposed between the fuel supply manifold 11 and the air intake manifold runner 15 such that they are subject to a pressure difference. The valve assemblies 20 must operate within this pressurized environment in a rapid and repeatable fashion in order to insure consistent admission of fuel to the cylinders and the balanced firing and efficiencies associated therewith. As will be detailed below, the valve assemblies 20 are specifically configured to take advantage of this pressurized environment and achieve these ends. Moreover, the valves 20 are electromagnetically actuated and, thus, adapted to computerized control which facilitates both control of the individual valves 20 and consistent valve performance.

As best seen in FIG. 2A, each valve assembly 20 is preferably provided with two opposed face-to-face disks—a fixed disk 22 and a translatable disk 24—whose separation permits fuel flow. As best seen in FIG. 2A, the translatable disk 24 is juxtaposed with the fixed disk 22 in the closed state. Both of these disks 22, 24 are constructed with a nested porting arrangement which permits fuel flow when the disks 22, 24 are separated but prevents flow when the disks 22, 24 are in contact. Thus, in operation, the translatable disk 24 is lifted from the fixed disk 22 to open the valve assembly 20 and is returned to its original position (juxtaposed with the fixed disk 22) when the valve assembly 20 is closed.

As previously mentioned, it is important that the valve assembly 20 opens and closes rapidly. Indeed, in the ideal situation the valves would pass directly from the fully open position to the fully closed position without passing through a transition position. In an effort to simulate this ideal, the present invention rapidly translates the movable disk 24 a very short distance, less than 1 millimeter, to reach either the fully open or fully closed state. Indeed, in the preferred embodiment the valve assembly 20 will pass from the fully closed to the fully open position in 1.2 msec for a pressure drop across the valve of 0.0 bar (abs) and from the fully open to the fully closed in 1.8 msec under the same pressure conditions. If the pressure drop is increased to 2.0 bar (abs), the preferred embodiment of the valve assembly 20 will move from the closed position to the fully open position in 1.9 msec, and from the fully open position to the closed position in 1.4 msec. Thus, the inventive valve assembly 20 is truly a "high speed" gas admission valve.

While such short disk throws combined with rapid actuation as detailed below limit the amount of time the translatable disk 24 spends in transition between the closed and open positions and vice versa, the small throws also limit the area between the disks 22, 24 which permit fuel flow when the valve assembly is in the open position. Indeed, the separation area between the disks 22, 24, which is equivalent to the product of the disk throw and the perimeter of the port or ports, approximately defines the operating port size for the valve assembly 20 and, thus, is a major factor determining the amount of fuel admitted per cycle. Thus, in order to increase fuel flow this separation area must be likewise increased. One way to increase the separation area is to increase the throw of the translatable disk 24. However, this technique conflicts with both the desire to achieve rapid opening and closing of the valve assembly 20 mentioned above and the ability of the magnetic coil to generate sufficient force at reasonable power levels to translate the disk (i.e. larger translations might require substantially more power). Thus, the present invention increases the perimeters or peripheries of the ports to increase fuel flow by providing the nested porting arrangement.

In the preferred embodiment, the bottom of the low mass translatable disk 24 which preferably has an outer diameter of about 48 mm, is constructed to include three concentric circular lands 26, 28, 29 as illustrated in FIG. 3A. These lands 26, 28, 29 are completely separated by two similarly concentric, circular channels 30, 32 which comprise the ports of the translatable disk 24. It will be appreciated that these circular ports 30, 32 each in effect have two perimeters—an inner and an outer perimeter—for permitting fuel flow. Thus, the circular ports 30, 32 have a total of four perimeters or peripheries which thereby permits high fuel flow even with very small disk translations.

Figure 2B:
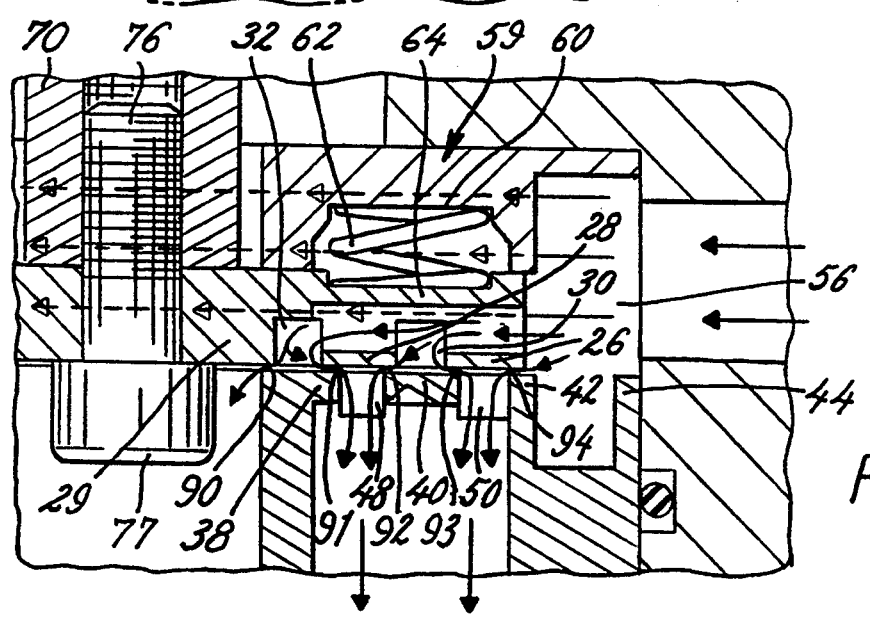
FIG. 2B is an enlarged fragmentary view of the porting arrangement employed in the valve assembly of FIG. A illustrated with the valve assembly in the fully open, maximum flow state.
Figure 5:
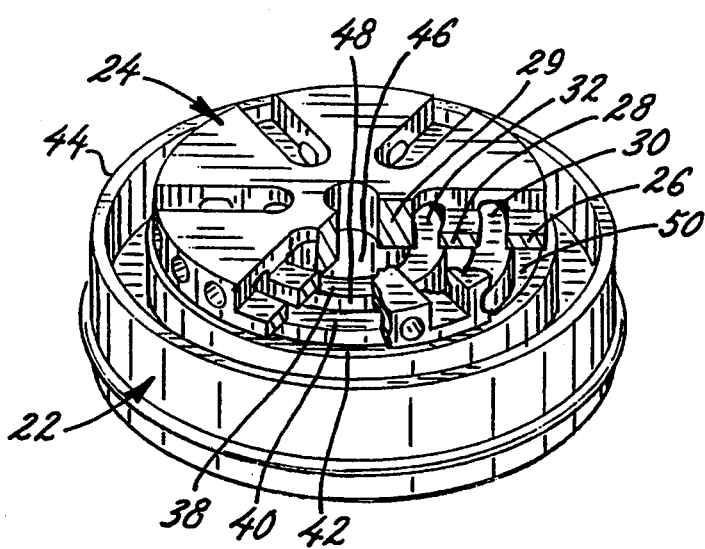
FIG. 5 is a fragmentary perspective view of the translatable disk juxtaposed upon the fixed disk with part of the translatable disk broken away.

In addition to the four perimeters formed by the circular ports 30, 32, the outside perimeter of the translatable disk 24 which is formed by the outside edge of the circular land 26 located farthest from the center of the disk also acts as the periphery of a port for permitting fuel flow. In other words, as best seen in FIGS. 2B and 5, the separation of the translatable disk 24 from the fixed disk 22 creates a path for fuel flow. This path does not pass through the circular ports 30, 32 or indeed any portion of the translatable disk 24. Nonetheless, this path is opened and closed by the interaction of the translatable and fixed disks 22, 24. Thus, the translatable disk 24 actually has five perimeters or peripheries for permitting high fuel flow for small disk throws.

Further to this purpose, the circular lands 26, 28, 29 are integrally formed with a second land or web structure 34 as illustrated in FIG. 3B. Not only does this web structure 34 connect the lands 26, 28 and 29 of the translatable disk 24 thereby maintaining a unitary construction, but it also provides a complex porting arrangement for supplying the circular ports 30, 32 with fuel. As best seen in FIG. 3B, the web structure includes six radially extending ports 36a–f which each communicate with both of the concentric circular ports 30, 32 to supply them with fuel. In the preferred embodiment, these radially extending ports 36a–f are separated by areas of the webbed structure 34 which take the form of triangular lands 31a–f. Further, as illustrated in FIG. 3C, the sides of the translatable disk 24 are preferably bored with additional radially extending cylindrical ports 35a–c disposed beneath the triangular lands 31a–f in groups of three. As illustrated in FIGS. 3A and 3B, the central bore 35a of each bore group communicates with both of the concentric channels 30, 32. The bores 35b to either side of the central bore 35a are shorter and, thus, only communicate with the concentric channel 30 which is furthest displaced from the center of the disk 24. Thus, it can be seen that the translatable disk 24 is provided with multiple supplying ports which supply the concentric circular ports 30, 32 with fuel. Further, the circular ports 30, 32 achieve high fuel flow for small disk translations by virtue of their multiple periphery construction.

Figure 4A:
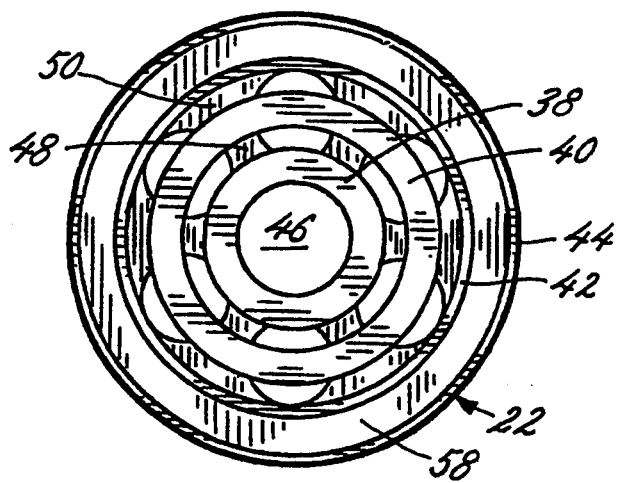
FIG. 4A is a top view of the fixed disk employed in the valve assembly taken along lines 4—4 of FIG. 2.
Figure 4B:
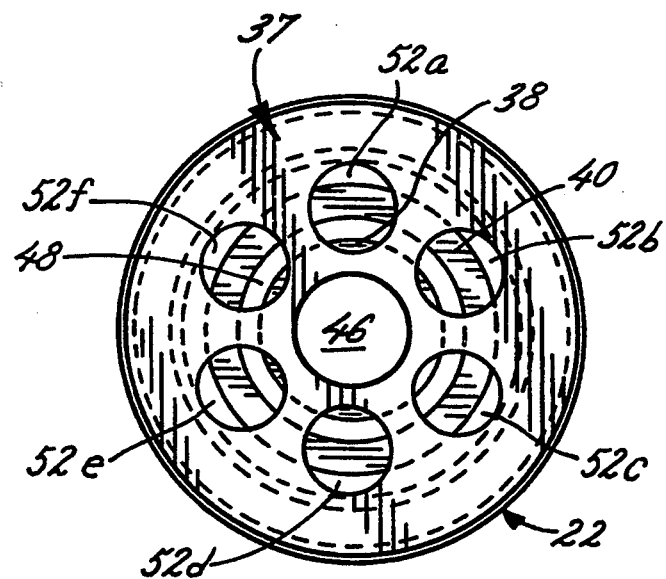
FIG. 4B is a bottom view of the fixed disk.

As illustrated in FIGS. 4A and 4B, the fixed disk 22 employs a nested porting structure which is similar to that of the translatable disk 24. However, the fixed disk's porting arrangement is arranged opposite to that of the movable disk 24. More specifically, the top of the fixed disk 22, which abuts the bottom of the translatable disk 24 when the valve 20 is closed, includes an arrangement of concentric circular ports and lands and the bottom of the fixed disk 22 is formed with a webbed structure 37 which connects the circular lands. The fixed disk 22, which preferably has an outer diameter of about 50 mm, includes three lands 38, 40, 42 defining the ports of the fixed disk 22. A further land 44 located at the outer perimeter of the disk 22 combines with land 42 to define a channel 58 rather than a port as will be detailed momentarily. Further, the center 46 of the fixed disk 22 comprises a circular port surrounded by land 38. This port 46 passes completely through the disk 22.

In the illustrated embodiment, the fixed disk 22 further includes two concentric circular ports 48, 50 similar to the circular ports 30, 32 of the translatable disk 24. As best seen in FIG. 4B, these circular ports 48, 50 communicate with six ports 52a–f in the webbed structure 37 of the fixed disk 22 which are radially arranged and pass the fuel received from the circular channels 48, 50 to the air intake system for admission to the engine's cylinders. In the preferred embodiment, the ports 52a–f of the fixed disk 22 are circular and form cylindrical channels communicating with the combustion cylinder via the air intake manifold runner 16 of the air intake system.

It should be noted that both the webbed structure 34 of the translatable disk 24 and the webbed structure 37 of the fixed disk 22 can take any form which connects the circular lands of the respective disk 22, 24 and which provides a porting arrangement for permitting fuel flow to or from the circular ports of the respective disk 22, 24. Thus, although the webbed structure 34 of the translatable disk 24 has been illustrated as including triangular lands 32a–f defining radially extending ports 36a–f and the webbed structure 37 of the fixed disk 22 has been shown as a solid structure bored with six cylindrical ports 52a–f, it will be appreciated that other configurations might also be appropriate.

Although the circular ports and lands of both disks 22, 24 are concentrically disposed about the same central axis, they are displaced with respect to one another. As best seen in FIG. 5, the lands 26, 28, 29 of the translatable disk 24 are disposed opposite to the circular ports 46, 48, 50 of the fixed disk. Similarly, the lands 38, 40, 42 of the fixed disk 22 are disposed opposite to the circular ports 30, 32 of the translatable disk 24. Moreover, the lands of both disks 22, 24 are wider than the circular channels they define. As a result, when the two disks 22, 24 are juxtaposed, the lands 26, 28, 29 of the translatable disk 24 abut the lands 38, 40, 42 of the fixed disk 22 such that their edges slightly overlap as shown in FIG. 5. In other words, the lands of the translatable disk 24 mate with the circular ports of the fixed disk 22 and vice versa. The overlapping of these lands prevents communication between the concentric ports 30, 32 of the translatable disk 24 and the circular ports 46, 48, 50 of the fixed disk 22 thereby preventing fuel flow when the disks 22, 24 are juxtaposed. Thus, as best seen in FIG. 2B, the interaction of the concentric lands 26, 28, 29, 38, 40, 42 and circular ports 30, 32, 46, 48, 50 of the disks 22, 24 results in multiple pressure seals or face type poppet valves 90, 91, 92, 93, 94 which permit fuel flow when the disks are separated but prevent flow when the disks abut. The flat overlapping of the circular lands 26, 28, 29, 38, 40, 42 on both disks 22, 24 minimizes leakage of these five concentrically disposed face type poppet valves 90, 91, 92, 93, 94 when the valve assembly 20 is closed.

It will be appreciated by those skilled in the art that the nested porting arrangement must promote high flow rates for small disk translations. Thus, according to the teachings of the invention, it is advantageous to provide a nested porting arrangement with multiple perimeters to maximize the effective port area and thereby maximize flow rates. The illustrated embodiment with its concentric circular channels, ports, and lands is one possible configuration for achieving this end. However, other nested porting arrangements employing different multiple perimeter channel or port configurations might accomplish the same end. Thus, the invention is not limited to any particular configuration of channels or ports in a nested porting arrangement but, instead, can take any shape and be distributed in any nested arrangement which is conducive to controlled fuel flow.

As best seen in FIG. 2A, the disks 22, 24 are disposed within a valve assembly housing 8 having a fuel inlet port 54 which communicates with the gas supply manifold 11. Further, this fuel inlet port 54 communicates with a ring-shaped chamber 56 defined by the circular side wall of the translatable disk 24, the valve assembly housing 8 and a circular channel 58 in the fixed disk 22. As most easily seen in FIG. 4A, the circular channel 58 in the fixed disk 22 is defined by the outermost lands 42, 44 of the disk 22. As best seen in FIG. 2A, this channel 58 does not directly pass fuel through the disk 22 but instead combines with the housing 8 and the spring seat structure 59 to provide a passage for fuel flow, namely, the ring-shaped chamber 56, which insures all of the ports of the translatable disk 24 are supplied with fuel. Thus, in a sense, the ring-shaped chamber 56 formed by the channel 58 of the fixed disk 22 and the valve assembly housing 8 is an extension of the fuel inlet port 54.

As previously mentioned, the gaseous fuel supplied to the ring-shaped chamber 56 via the fuel inlet port 54 is maintained at a pressure $P_1$ which is higher than the pressure $P_2$ maintained in the air intake manifold runner 16. For example, in the preferred embodiment $P_2$ varies with the engine load between a vacuum during idle conditions and approximately 3 bar (abs) at full load. $P_1$, on the other hand, normally operates between 0.5 and 2.0 bar (abs) above $P_2$. Thus, although the pressure levels may vary, $P_1$ is always somewhat higher than $P_2$. This pressure difference between the valve inlet ports and valve outlet ports provides an effective force for urging fuel flow through the nested porting arrangement when the translatable disk 24 is separated from the fixed disk 22. Moreover, it will be appreciated that the bottoms of the circular lands 26, 28, 29 of the translatable disk 24 will be maintained at the pressure $P_2$ by virtue of their communication with the concentric circular ports 50, 48, 46 of the fixed disk 22. Similarly, the tops of these same lands 26, 28, 29 will be maintained at the pressure $P_1$ by virtue of its contact with the pressurized fuel. Thus, the same pressure difference which effectively urges flow when the valve is open also biases the translatable disk 24 into the closed position abutting the fixed disk 22 thereby creating a seal. Consequently, the movable disk 24 will be juxtaposed with the fixed disk 22 thereby preventing fuel flow as mentioned above except when the coil generates a magnetic field of sufficient strength to overcome this bias.

Furthermore, as best seen in FIG. 2A, the housing assembly 8 is provided with a spring seat structure 59 including spring seats 60 for carrying biasing means 62 which combine with the pressure difference mentioned above to bias the movable disk 24 into juxtaposition with the fixed disk 22. As most easily seen in FIG. 3B, the translatable disk 24 is also provided with spring seats 64 for receiving the biasing means 62. Thus, the biasing means 62 are disposed between the spring seats 60 of the spring seat structure 59 and the spring seats 64 of the movable disk 24. The biasing means 62 are preferably distributed about the surface of the translatable disk 24 and are constructed to resist lateral movement. Thus, the biasing means 62 also maintain the concentricity of the ports and lands in the translatable disk 24 relative to the ports and lands of the fixed disk 22 thereby preventing lateral sliding of the disks 22, 24 and the wear associated with such movement.

As shown in FIG. 3B, the preferred embodiment employs six biasing means 62 and associated spring seats 60, 64. Nonetheless, it will be appreciated that other numbers and arrangements of spring seats with associated biasing means might also be appropriate. Further, although in the preferred embodiment, the biasing means 62 comprise coils springs, it will be appreciated that any other type of biasing means capable of supplying sufficient force to compress the translatable disk 24 against the fixed disk 22 without preventing the translation of the disk 24 altogether might also be acceptable.

In accordance with an important aspect of the invention, the valve assembly is electromagnetically actuated. Thus, the movable disk 24 is translated by subjecting an armature associated with the disk 24 to a magnetic field sufficient to overcome the combined downward forces of the biasing means 62 and the pressure difference as detailed below. To avoid the need for excessively high magnetic fields and to minimize the energy required to operate the valve assembly 20 (indeed, in the preferred embodiment, each valve assembly requires less than 10 watts to be held open), the movable disk 24 is constructed to have low mass.

It should be noted that the valve assembly 20 is not constructed to withstand the high back pressures generated within the cylinders of an internal combustion engine 12 during combustion. Indeed, were the valve assembly 20 mounted directly to a cylinder, the high pressures of combustion would cause $P_2$ to greatly exceed $P_1$. This pressure reversal would cause the translatable disk 24 to unseat from the fixed disk 22 thereby permitting substantial backflow and possible combustion within the fuel supply manifold 15. Accordingly, it is essential that the valve assembly 20 is shielded from these pressures during operation. This shielding can be performed by an additional valve contained within the engine 12 such as an air intake valve or piston porting in the case of a two cycle engine. For purposes of explanation, it will be assumed that the air intake manifold runner 15 is coupled to such an air intake valve which opens and closes into the cylinder. Moreover, it will be assumed that the air intake valve is timed to always be closed during combustion thereby shielding the valve assembly 20 from combustion pressures.

In order to facilitate electromagnetic actuation, the valve assembly 20 is provided with a low mass magnetically attractable armature 70 disposed within a T-shaped chamber 74 in the valve assembly housing 8. As best seen in FIG. 2A, the armature 70 is constructed in a similar T-shape with a cylindrical post and square top such that it can move vertically within the T-shaped chamber 74 when attracted by magnetic fields as explained below. The low mass armature 70 is fixedly attached to the translatable disk 24 such that any movement of the armature 70 results in a corresponding movement of the movable disk 24. To this end, the centermost land 29 of the movable disk 24 is provided with a central aperture 74 as illustrated in FIGS. 3A and 3B. This aperture 74 is equipped to receive a screw 76 which can be threaded into the armature 70 such that the armature 70 firmly abuts the disk 24 as illustrated in FIGS. 2A, 2B and 2C. As best seen in FIGS. 2A, 2B and 2C, the head 77 of screw 76 is received by the central port 46 in the fixed disk 22 which thus serves a dual role in that it also comprises one of the ports for fuel admission discussed above.

In order to create a magnetic field of sufficient force to attract and move the low mass armature 70 and the attached movable disk 24, the valve assembly 20 is provided with a high permeability magnetic core 80 having an associated coil 82. In the preferred embodiment, the high permeability core 80 preferably has a rectangular block shape and a circular channel 83 for carrying the coil 82. Thus, the preferred core 80 is shaped like an "E" and can be termed an "E-core". However, it will be appreciated that other core shapes and configurations might also be appropriate. In any event, in the preferred embodiment the coil 82 is wound through the circular channel 83 such that it surrounds a central post 84 of the E-core 80. This core-coil combination generates a strong magnetic field when the coil 82 is energized. The E-core 80 is disposed within a chamber 86 of the E-core housing 7 which communicates with the T-shaped chamber containing the armature 70. Consequently, the E-core is disposed directly above and nearly in contact with the armature 70. Thus, the strong magnetic field generated by the core-coil combination quickly attracts the armature 70 thereby separating the translatable disk 24 from the fixed disk 22.

The translatable disk 24 will move upwards against the combined downward forces of the biasing means and the gas pressure in response to this magnetic field. However, as best seen in FIG. 2B, the webbed structure 34 of the translatable disk 24 abuts the spring seat structure 59 when the valve assembly 20 is in the fully open position. Thus, the upward translation of the disk 24 will be limited by the spring seat structure 59. Further, the armature 70 and spring seat structure 59 are positioned such that the low mass armature 70 never contacts the core 80. Thus, even in the fully open position, there is a small air gap 79 between the armature 70 and the core. This gap 79 is very small. For instance, in the illustrated embodiment, the gap 79 is 0.5 mm at its largest (i.e. with the valve closed) and 0.1 mm at its smallest (i.e. with the valve fully open).

It will be appreciated by those skilled in the art that the magnetic field must be sufficient to overcome the spring force of the biasing means 62 and the pressure imbalance across the valve assembly 20 which together bias the movable disk 24 towards the closed position. Consequently, the movable disk 24 must be constructed with relatively low mass and the biasing means 62 must be chosen with appropriate spring constants, preloads and lateral strength. It should also be noted that the core 80 can be constructed from any high permeability material in any shape conducive to supporting magnetic fields sufficient to separate the translatable disk 24 from the fixed disk 22. However, in the preferred embodiment, the core 80 comprises a laminated stack of steel formed into the "E" shape set out above. A preferred manner of constructing the core employs 0.356 mm slices of M19 electrical grade steel. The core 80 preferably employs such a laminated stack of steel slices in order to prevent the problems resulting from eddy currents which are well known in the art.

The coil 82 is electrically connected to an associated two phase driver 16 which supplies the coil 82 with sufficient current to generate strong magnetic fields within the core 80. As illustrated in FIG. 2A, the valve assembly 20 is provided with a receptacle 81 which makes the electrical connection of the driver to the valve assembly 20 very easy. Moreover, because of this receptacle 81, the driver 16 can be remotely located from the valve assembly 20. In operation, the two phase driver 16 first supplies the coil 82 with current generating a magnetic field within the high permeability core 80 which attracts the armature 70 and the attached translatable disk 24. The translatable disk 24 moves upward until it abuts the spring seat structure 59 as illustrated in FIG. 2B, thereby separating from the fixed disk 22 and opening the valve assembly 20. As a result of the pressure imbalance discussed above, fuel directed towards the movable disk 24 via the fuel inlet port 54 and the distribution ring 56 then flows through the ports of the webbed structure 34 and into the circular channels 30, 32 in the movable disk 24. As illustrated in FIG. 2B, the lands 26, 28, 29 of the translatable disk 24 no longer abut the lands 38, 40, 42 of the fixed disk 22. Consequently, the pressure seal is broken and fuel flows both from the circular ports 30, 32 and around the outer diameter of the translatable disk 24 into both the two circular ports 48, 50 and the central port 46 of the fixed disk 22. From here the fuel in the circular ports 48, 50 passes into the cylindrical ports 52$a$–$f$ of the fixed disk 22 illustrated in FIG. 4B and then into the air intake manifold runner 15 for admission to the cylinder. The fuel which flows through the central port 46 passes directly to the air intake manifold runner 15.

When the valve assembly 20 has been open for a sufficient period of time, the two phase driver 16 will terminate the current flow through the coil 82 by disconnecting the power supply and activating a turn-off circuit for draining energy from the coil 82. The termination of the current flow quickly collapses the magnetic field within the core 80 thereby freeing the armature 70 and the movable disk 24 to return to their closed position. The combined force of the biasing means 62 and the pressure imbalance then quickly returns the translatable disk 24 into juxtaposition with the fixed disk 22 as illustrated in FIG. 2C thereby re-establishing the pressure seal.

It should be noted that in the preferred embodiment, the overall port size of the valve assembly 20, which is roughly equivalent to the sum of the individual port sizes, is quite large relative to the disk throw. Thus, the valve assembly 20 achieves high gaseous fuel flow with disk translations of less then one millimeter. More specifically, the valve assembly 20 preferably achieves fuel flow on the order of 100 gram/sec for a translation of the movable disk of only 0.4 mm when $P_1$, the pressure of the fuel supplied by the fuel supply manifold 15, is approximately 5 bar (abs) and $P_2$, the pressure within the air intake manifold runner 15, is approximately 3 bar (abs) with the engine running at full load. It should be noted, however, that these performance characteristics are given by way of example. Thus, one could practice the invention by employing valve assemblies with larger ports and larger travels as the particular application demands (i.e. increasing disk diameter readily gives a mechanism for increasing the port size).

In certain aspects, the practice of the invention involves a highly responsive, high flow rate, electrically operated valve assembly 20 as set forth above. In addition this valve assembly 20 is capable of supplying fuel flow rates useful to an engine 12 but operable by an electrical pulse of reasonably low energy. The valve assembly 20 opens and closes at the edges of the pulse, and the pulse is processed by current control means as set forth below such that an electronic fuel injection controller (EFIC) 18 which drives the driver 16 can very accurately establish the open instant of the valve assembly 20, the closed instant of the valve assembly 20, and consequently the dwell time during which the assembly 20 is open.

Figure 6:
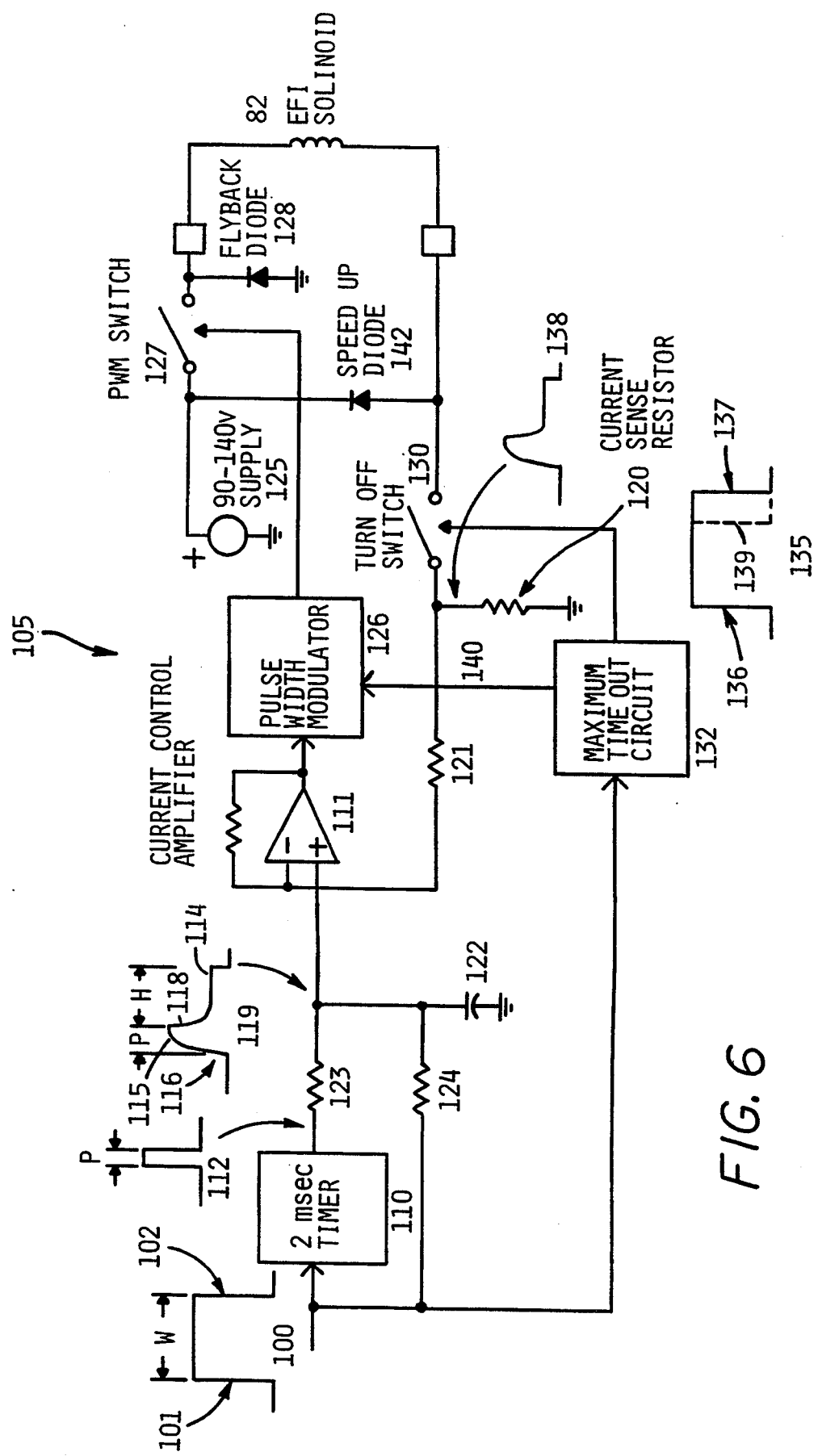
FIG. 6 is a block diagram representation of an electronic fuel admission driver employed in the system illustrated in FIG. 1.

In accordance with that aspect of the invention, an electronic fuel injection driver 16 is provided which is capable of responding to an electrical signal to first of all supply currents capable of opening the valve assembly 20 very rapidly, and then reduce the energy in the electromagnetic circuit including the coil 82 so that at the termination of the signal, the valve assembly 20 will rapidly close. An exemplary circuit for accomplishing this "two phase" operation is shown in FIG. 6. It should be noted that one driver 16 is able to drive several valve assemblies 20. Consequently, although for simplicity of understanding the driver 16 will be described as driving an individual valve assembly 20, it will be understood that several driver circuits could be grouped in a single driver module for operating multiple valves 20 simultaneously although the valves 20 will not necessarily open and close at the same time.

An input electrical signal 100 is shown in FIG. 6. This input signal 100 has a leading edge 101, a trailing edge 102, and a time duration between the leading and trailing edges designated "W", which specifies the width of the control pulse determining the open and close instances of the valve assembly 20. The pulse 100 can be produced by the electronic fuel injection controller 18 of FIG. 1, and may be at logic levels, or if preferred, amplified, passed through a fiber optic coupler, and the like. In any event, the pulse 100 contains insufficient energy for directly operating the valve assembly 20. Consequently, driver circuitry generally indicated at 105 is provided for driving the electromagnetic circuitry in response to the pulse 100. The electromagnetic circuitry in FIG. 6 is represented by coil 82, which is the electromagnetic coil element of the valve assembly 20 illustrated in detail in FIG. 2A.

When an input pulse 100 is first received by the two phase electronic fuel injection driver 16, the pulse 100 is initially passed through a timer 110. In the illustrated embodiment the timer 110 is a 2 millisecond timer. The output of the timer 110 is passed through biasing circuitry to the non-inverting input of a current control amplifier 111. The purpose of the 2 millisecond timer 110 is to divide the width "W" of the input pulse 100 into two intervals, a pull-in phase (designated "P") which provides the coil 82 with a high energy pull-in current to assure rapid valve opening, and a hold-in phase (designated "H") which provides a hold-in current for maintaining the valve assembly 20 in the open position. The 2 millisecond pulse 112 and the input pulse 100 are added together through the summing resistors 123 and 124 and filtered by the capacitor 122 to create the current reference pulse 119. Thus, the pulse 119 is seen to have two levels, a first or higher level 115 which in the illustrated embodiment of the invention is representative of an output current of 8 amps, and a second or lower level 114 which in that same illustrated embodiment is representative of an output current of 2 amps. The "P" pull-in phase in this preferred embodiment is set to be about 2 milliseconds, and has a leading edge 116 which is coincident with the leading edge 101 of the input pulse. The trailing edge 118 of the 2 milliseconds pulse then occurs 2 milliseconds after the leading edge 116, providing an interval of 2 milliseconds for an 8 amp drive to the coil 82. That 2 milliseconds 8 amp interval "P" is then followed by a hold-in phase "H" in which the drive current is established at 2 amps. By means to be described below, the trailing edge 102 of the input pulse 100 causes the two phase driver 16 to rapidly collapse the current in the coil 82 and thereby close the valve assembly 20.

The current control amplifier 111 has an input coupled to the inverting input of the amplifier which is produced by a current sensing resistor 120 which, as will be described below, senses the magnitude of the current in the valve coil 82. That signal is passed through a summing resistor 121 and coupled to the inverting input of the amplifier 111, where it is matched with the current reference pulse 119.

The amplifier 111 has an output which drives a pulse width modulator 126 which supplies a driving voltage to the coil 82 which in turn produces a current in the current sensing resistor 120 which matches the demand current at the capacitor 122. Due to the two level nature of the current reference pulse 119, the current sensed in the resistor 120 is first at a high level (8 amps in the illustration) for a period of 2 milliseconds, then reverts to a lower level (such as 2 amps in the illustrated embodiment) for the duration of the width of the input pulse 100. This two interval drive pulse 119 results in a high current being passed through the coil 82 initially (on the order of 8 amps as explained below) thereby insuring a rapid opening of the valve assembly 20. Then, to avoid any damage to the circuit's components which might result from a sustained current of this level and to enable the rapid collapse of the magnetic field in the coil 82, the current is dropped in the hold-in phase to a level (2 amps in the illustrated embodiment) which is still sufficient to hold the valve assembly 20 fully open. This lower hold-in current also results in less heat build-up in both the valve assembly 20 and the driver circuitry 105 than would occur with higher current levels. Since power consumption is directly related to current squared, a reduction in current results in dramatic savings in power. Thus, the use of the two phase driver 16, not only insures rapid opening and closing of the valve 20 but it also optimizes power use.

In the illustrated embodiment, the pulse width modulator 126 is a circuit which operates at a relatively high frequency to produce an output voltage having a controllable or modulated level for powering the coil 82. The pulse width modulator 126 controls the duty cycle of an output switch 127 to cause a current flow in the coil 82 and the sensing resistor 120 (sensed through the summing resistor 121) to match the level of the drive current demanded by the complex input pulse 119.

It will be appreciated that although other drive schemes and modulation means can be provided, pulse width modulation as described above is presently preferred. The pulse width modulation applied by the circuit 126 is one possible mechanism for controlling the current through the coil 82 to insure consistent valve operation from cycle to cycle. Thus, other schemes capable of controlling current flow in the coil 82 which can rapidly and repeatably open and close the valve assembly 20 might also be appropriate.

The output switch 127 is in series circuit relationship with a driving power supply 125, the coil 82, the turn off switch 130 and the current sensing resistor 120. Thus, whenever the switch 127 is closed, a current path is completed for current from the power supply 125 through the coil 82 through the turn-off switch 130 and the sensing resistor 120 to the power supply common. When the switch 127 is opened during the off periods of the pulse width modulated duty cycle, a path for continued current flow is provided by means of a fly-back diode 128. Thus, during the open intervals of the modulating duty cycle, the collapsing magnetic field produces a negative voltage at the upper portion of the coil 82 and current flow is through the fly-back diode 128 to the upper portion of the coil 82 through the coil 82, turn off switch 130, current sense resistor 120 and ground back to the flyback diode 128.

Selectively activated turn-off circuitry is provided for terminating the current through the coil 82 and collapsing the flux within the core 80 at the termination of the firing pulse 100. In the illustrated embodiment, such selectively activated circuitry comprises a turn-off switch 130 and a speed-up diode 142. The turn-off switch 130 is normally maintained in the closed condition, and at the trailing edge 102 of the firing signal 100 is caused to rapidly open. A speed-up diode 142 is coupled in inverse parallel relationship with the coil 82 and is positioned in the circuit with respect to the turn-off and modulating switches 130, 127, such that at the termination of the drive pulse 100, when the turn-off switch 130 is opened to uncouple the power supply 125 from the coil 82, and the modulating switch 127 is also opened to uncouple the power supply 125, the speed-up diode 142 rapidly returns the energy stored in the coil 82 to the power supply 125. Thus, as the lower portion of the coil 82 becomes positive due to the collapsing magnetic field at the opening of the switches 127 and 130, the diode 142 provides a path for current flow from the lower portion of the coil 82 back to the power supply 125 and ground, and through the fly-back diode 128 to the upper portion of the coil 82. This causes the rapid collapse of energy in the coil 82, assuring rapid closing of the valve assembly 20. Thus, when the turn-off circuitry is activated, the coil 82 is reverse biased with respect to the power supply to achieve rapid closing of the power supply.

In order to prevent excessive dwell times, the driver 16 is provided with a protection means. To this end, the input pulse 100 is coupled not only to the turn-on timer 110, but also via a maximum time-out timer 132 to the turn-off switch 130. The circuitry 132 is configured, in the normal mode, to open the switch 130 at the trailing edge 102 of the firing signal 100. The circuit 132 performs its safety function by establishing a maximum on period for the coil 82. That period can be set at, for example, 45 milliseconds, such that the timer has an output pulse shape as illustrated at 135. That output pulse shape includes an edge 136 coincident with the rising edge 101 of the firing signal 100, and a trailing edge 137 which occurs at the termination of the maximum interval (such as 45 milliseconds). If the trailing edge 137 occurs before the trailing edge 102 of the firing signal 100, that trailing edge 137 acting via control line 138 causes the opening of the switch 130 to prevent the coil 82 from holding the valve assembly 20 open too long. However, in the normal course, a dotted trailing edge 139 is coincident with the trailing edge 102 of the firing signal 100 and causes the opening of the switch 130 before the safety function of the circuitry 132 engages. A further output 140 from the time-out circuitry 132 occurs—coincidentally with the pulse 139 or pulse 137, if it occurs first, and operates through the pulse width modulating driver 126 to turn off the pulse width modulation switch 127 thus initiating the turn off action described previously.

With that understanding of the structure and function of the driving circuit 105, it will now be apparent that the circuit 105 is configured to operate in combination with the valve assembly 20 described above to provide a highly efficient electrically operated fuel admission system 10 which has sufficient flow capacity to meet the needs of an engine or other device, combined with sufficient electrical responsiveness to produce opened and closed conditions of the valve assembly 20 which closely follow the width of an input driving pulse 100. Thus, at the rising edge 101 of the driving pulse 100, the current driver circuitry 105 causes a high current pull-in interval of the pulse (2 milliseconds in the example) in which high current is supplied to the coil 82 to cause the rapid opening of the valve assembly 20. The two phase driver 16, after assuring a high drive pull-in current for a sufficient time to open the valve assembly 20, reduces the driving current to a hold-in level "H" until the termination of the drive pulse. The reduction in current has several advantages including: preventing damage to the coil 82 and driver 16 which might result from exposure to the high pull-in currents for an extended interval; preventing the excessive heat build-up and high power consumption which sustained high currents would necessarily engender; and reducing the magnetic flux in the magnetic circuit (coil 82) so that the valve assembly 20 will rapidly close at the termination of the driving pulse 100. At the termination of the drive pulse 100, the magnetic flux across the coil 82 is collapsed and the energy in the coil 82 is dissipated as set forth above.

In accordance with an important aspect of the invention, the "P" interval of reference pulse 119 is brought to its maximum value (8 amps in this embodiment) in a controlled fashion. Instead of forcing the current in the coil 82 to jump to its maximum value, the driver circuitry 105 controllably ramps the pull-in current to its maximum value. Thus, the current in the coil 82 steadily but quickly rises to the maximum value at the same rate from cycle to cycle. Under this approach, whereas the entire "P" interval will only last 2 milliseconds, a good portion of this 2 milliseconds will be spent ramping the pull-in current to its maximum value. For example, in the illustrated embodiment the pull-in current is ramped for 1.8 milliseconds of the 2 milliseconds "P" interval. Thus, the pull-in current is at its peak value for only approximately 0.2 milliseconds. This approach enables the two phase drivers 16 to produce a consistent pull-in current in the coil 82 (and, consequently open the valve assembly 20 consistently) cycle after cycle regardless of any other variations in the system. For instance, if the power supply 125 experiences fluctuations, the fluctuations should not be reflected in the coil current since it is raised in controlled fashion rather then merely reflecting the maximum current rise time available from the power supply 125.

In summary, it can be seen that the present invention provides an electronic fuel admission system 10 which is capable of performing consistently under the extreme conditions present in industrial engines and the like. The fuel admission system 10 includes electrically controllable valve assemblies 20 which open and close in repeatable fashion with minimal delays. In addition, the fuel admission system 10 is provided with two phase drivers 16 which open and close the individual valve assemblies 20 consistently from cycle to cycle. These drivers 16 are additionally capable of independently adjusting both when the valve assemblies 20 open and the dwell time of each individual valve 20. Thus, the present invention provides an electronic fuel admission system 10 which includes electrically controllable valve assemblies 20 for controlling fuel flow within large industrial engines and the like.

Further, the inventive fuel admission system 10 is compact, lightweight and economical. It does not employ hydraulic or mechanical actuation means or their attendant support systems. Instead, the invention employs electrical actuation which improves the controllability of the system 10. In particular, the system 10 can govern the speed of an engine 12 by adjusting the open time of the valve assemblies 20. It can also match the output of the individual cylinders by adjusting the dwell times of the valve assemblies individually to achieve improved engine performance.

We claim:

1. A high speed electrically energized flow control valve assembly comprising, in combination:
   a valve body with an inlet port and an outlet port, the flow control valve assembly being constructed to control flow from a higher pressure region connected to the inlet port to a lower pressure region connected to the outlet port;
   a pair of opposed disks mounted in the valve body including a first disk and a second disk, the first disk defining a nested porting arrangement including interconnected lands defining multiple concentric ports with multiple peripheries, the second disk having lands disposed opposite the concentric ports of the first disk, one of the opposed disks being translatable between a closed position in which the lands of the second disk close the concentric ports of the first disk and an open position in which the disks are separated a predetermined distance to open the concentric ports at the peripheries thereof, the concentric ports of the first disk and the lands of the second disk exposing areas to the high and low pressure regions so as to provide a pressure seal; and,
   a low mass armature attached to one of the opposed disks and associated with a core for generating magnetic fields, the armature and the core defining an air gap therebetween sufficiently small to produce a magnetic field adequate to overcome the pressure seal but sufficiently large to allow separation of the opposed disks by the predetermined distance, thereby to open the valve assembly.

2. A high speed electrically energized flow control valve assembly as defined in claim 1, wherein the interconnected lands of the first disk are connected by a first webbed structure having ports which communicate with at least one of the multiple concentric ports defined by the interconnected lands.

3. A high speed electrically energized flow control valve assembly as defined in claim 1, wherein the lands of the second disk define multiple concentric ports having multiple peripheries in the second disk and the lands are connected by a second webbed structure, the second disk thereby defining a nested porting arrangement.

4. A high speed electrically energized flow control valve assembly as defined in claim 3 wherein the second webbed structure includes ports which communicate with at least one of the multiple concentric ports defined by the lands in the second disk.

5. A high speed electrically energized flow control valve assembly as defined in claim 1 further comprising biasing means for biasing the second disk into juxtaposition with the first disk.

6. A high speed electrically energized flow control valve assembly as defined in claim 1, wherein the armature and the disks are constructed so as to require less than about one millimeter translation between the open and closed position.

7. A high speed electrically energized flow control valve assembly as defined in claim 1 wherein the multiple concentric ports of the valve assembly define an area sufficient to achieve a flow rate of at least 100 gram/sec for a disk translation of about 0.4 mm.

8. A high speed electrically actuated flow control valve assembly comprising, in combination:
   a face-type valve assembly having two opposed face-to-face disks biased into juxtaposition by a pressure imbalance, at least one of the disks having a nested porting arrangement which prevents flow when the disks are juxtaposed yet permits high flow resulting from the pressure imbalance when the disks are separated a small predetermined distance;
   an armature connected to at least one of the disks for separating the disks when subjected to a magnetic field;
   a high permeability magnetic core associated with the armature and having a coil for energizing the core for generating the magnetic field which attracts the armature; the armature and the core defining an air gap therebetween sufficiently small to produce a magnetic field adequate to overcome the pressure imbalance but sufficiently large to allow separation of the disks by the small predetermined distance; and, a two phase driver for the coil having a pull-in phase and a hold-in phase, the pull-in phase delivering a high current which is controllably ramped at a predetermined rate to a first given level for controllably powering the coil to rapidly separate the disks consistently from cycle to cycle, and the hold-in phase delivering reduced current to the coil at a second given level adequate to hold the disks apart but to promote rapid release and collapse of energy in the coil when the face type valve assembly is to be closed.

9. A high speed electrically actuated flow control valve assembly as defined in claim 8 wherein the two phase driver further comprises a circuit for controllably powering the coil consistently from cycle to cycle including:

a switch for selectively connecting a power supply to the coil;

a modulator for opening and closing the switch to control the current in the coil; and, an amplifier for comparing the current in the coil with a current reference pulse and for producing an output signal driving the modulator to operate the switch such that the current in the coil and the current pulse signal are matched.

10. A high speed electrically actuated flow control valve assembly as defined in claim 8 wherein the two phase driver includes selectively activated turn-off circuitry for returning the current in the coil to the power supply to rapidly close the face type valve assembly.

11. A high speed electrically actuated flow control valve assembly as defined in claim 10, wherein the selectively activated turn-off circuitry includes a speed-up diode and a switch for returning current to a power supply to achieve rapid closing of the face type valve assembly.

12. A high speed electrically actuated flow control valve assembly as defined in claim 8 wherein the two phase driver includes a maximum time out circuit for rapidly closing the face type valve assembly when a maximum dwell time has been achieved.

13. A high speed electrically actuated flow control valve assembly as defined in claim 8, wherein the armature and the disks are constructed so as to require less than one millimeter translation between the open and closed position.

14. A high speed electrically actuated flow control valve assembly as defined in claim 8, wherein the porting arrangement of the disks have sufficient area to achieve a fuel flow rate of at least 100 gram/sec for a disk translation of about 0.4 mm.

15. A high speed electrically actuated flow control valve assembly as defined in claim 8, wherein the two phase driver further comprises an input circuit including a timer and an R-C circuit for receiving an input pulse and providing a current reference pulse, the current reference pulse having a high energy pull-in current which is controllably ramped over time for consistently separating the face-to-face disks, and a lower energy hold-in current for maintaining the separation of the disks to insure consistent operation of the face type valve assembly from cycle to cycle.

16. A high speed electrically actuated flow control valve assembly as defined in claim 8, wherein the nested porting arrangement of each disk comprises concentric lands connected by a webbed structure, the concentric lands defining ports with multiple peripheries exposed for flow when the face type valve assembly is opened.

17. A high speed electrically actuated flow control valve assembly as defined in claim 16, wherein the ports defined by the concentric lands of a first one of the face-to-face disks are disposed opposite to the concentric lands of a second one of the disks, and the ports defined by the concentric lands of the second one of the disks are disposed opposite to the concentric lands of the first one of the disks, the opposed lands and ports forming multiple concentrically disposed face type poppet valves.

18. A high speed electrically actuated flow control valve assembly as defined in claim 17, wherein the opposed lands and ports comprise at least five concentrically disposed face type poppet valves in a face type valve assembly having an outer diameter of no more than about 50 mm.

19. A high speed electrically actuated flow control valve assembly as defined in claim 17 wherein the concentric lands of each disk are displaced with respect to the concentric lands of the other such that the lands of each disk partially overlap with the lands of the opposed disk when the disks are juxtaposed creating pressure sealed face type poppet valves.

20. A high speed electrically actuated flow control valve assembly as defined in claim 8 further comprising biasing means for biasing the face-to-face disks into juxtaposition.

21. A high speed electrically energized flow control valve assembly as defined in claim 3 wherein the second disk further includes a perimeter bored with a plurality of radially extending cylindrical ports communicating with at least one of the multiple concentric ports of the second disk.

* * * * *